United States Patent [19]

O'Connor et al.

[11] Patent Number: 4,940,116
[45] Date of Patent: Jul. 10, 1990

[54] UNATTENDED CHECKOUT SYSTEM AND METHOD

[75] Inventors: David F. O'Connor, Delray Beach; Wesley Dickover; Steven J. Tilidetzke, both of Coral Springs, all of Fla.

[73] Assignee: Checkrobot Inc., Deerfield Beach, Fla.

[21] Appl. No.: 320,063

[22] Filed: Mar. 7, 1989

[51] Int. Cl.⁵ .................... G06K 7/10; G07C 11/00
[52] U.S. Cl. ..................................... 186/61; 235/375; 235/383; 235/385
[58] Field of Search .............. 235/375, 383, 385, 462, 235/470; 186/52, 56, 61, 68, 69; 177/50; 364/403–405, 478, 567

[56] References Cited

U.S. PATENT DOCUMENTS

| | | | |
|---|---|---|---|
| 3,681,570 | 8/1972 | Abt | 235/383 |
| 3,688,087 | 8/1972 | Howard et al. | 235/385 X |
| 4,676,343 | 6/1987 | Humble et al. | 186/61 |
| 4,779,706 | 10/1988 | Mergenthaler | 186/61 |
| 4,780,599 | 10/1988 | Baus | 235/375 X |

Primary Examiner—Kevin P. Shaver
Attorney, Agent, or Firm—Robin, Blecker, Daley & Driscoll

[57] ABSTRACT

A system is provided for the operator-unassisted checkout of articles, inclusive of bulk articles, typically of the nature of produce or the like, wherein supermarket personnel or a customer applies a UPC label to the bulk articles upon selection, as distinguished from the normal instances wherein the article bears a "source-applied" UPC indication, e.g., as in the case of source-packaged goods. Price computation is effected for the bulk articles by scanning of the UPC indication and use of price per unit weight or price per piece derived from storage responsively to the scanning. The article measured weight or the numbers of the article are used respectively in computation of price for the selected bulk article.

13 Claims, 3 Drawing Sheets

UNATTENDED CHECKOUT SYSTEM AND METHOD

FIELD OF THE INVENTION

This invention relates generally to operator-unattended checkout systems and methods and pertains more particularly to the self-service checkout of bulk articles which are not prepackaged with universal product code (UPC) indication and are for sale on a weight or piece price basis.

BACKGROUND OF THE INVENTION

Commonly-assigned U.S. Pat. No. 4,676,343 and U.S. Pat. No. 4,792,018, hereby incorporated by this reference thereto, disclose systems for the automated checkout of articles selected by a customer for purchase in supermarkets and like facilities. The former patent involves an arrangement addressing articles which bear a so-called "universal product code" (UPC), typically in the form of a bar code uniquely indicative of the identity of the article bearing the code. The UPC of each article selected for purchase is scanned or read and a signal indicative of the article identity is generated and applied to a central processing unit which has stored in associated memory the UPCs of all articles available for purchase which are so encoded, correlated with the price and other characteristics of the articles, such as weight.

Articles are placed on a conveyor following UPC scanning and thereby led into a so-called "security tunnel", which is guarded against customer fraud by various light curtains, which are in the form of light sources and associated photocells. In the course of article conveyance, its weight is physically measured and a signal is generated indicative of the measurement.

Comparison is made of the stored, weight-indicative signal and the physical measured signal. If the comparison is negative, indicative of potential customer fraud, article processing is interrupted and various courses of action are obtainable, one being the reverse movement of the conveyor. Otherwise, in the course of continuing positive comparison results, the customer's order is carried forward, with price totalization effected from stored price-indicative signals.

In the latter patent, a number of further security measures are effected to detect customer fraud or checkout failure. In one such additional measure, article shape is detected, such as by the light curtain at the entry to the security tunnel. The CPU storage includes, with the article identity code a cross-correlation of article shape. This compilation is desirably made from the system itself, as by storage of detected article shape in a system set up mode, through use of the light curtain output signals.

A second additional measure is the repeat reading of article UPC in the security tunnel and comparison of the same with that read by the scanner. Checkout failure would be present on negative comparison in this respect.

A third additional measure is the introduction of electronic article surveillance (EAS) practice in the security tunnel. Here, storage is made with UPC of whether or not the article so encoded should have an EAS tag thereon. If the article is detected as having an EAS tag thereon and storage indicates that it should not, such as would be the case where a customer tries fraudulently to substitute an expensive wine purchase for a cheaper wine subjected to UPC scanning, checkout failure would again occur.

One difficulty in the operator-unattended checkout of articles, in the supermarket environment, has been the matter of bulk or non-prepackaged goods. These goods, such as food market produce items, are provided in bulk layout in bins or other compartments, for customer selection and bagging in plastic wrappers dispensable at the produce location. Typically, the customer selects the produce, places the same in the plastic wrapper, brings same to the point of checkout and manual, checkout assistance is requisite for effecting pricing and output of the selected produce.

SUMMARY OF THE INVENTION

The present invention has as its primary object the provision of improved systems and methods for operator-unassisted checkout.

A more particular object of the invention is to provide enhanced systems and methods for effecting automated checkout of bulk articles not prepackaged and not UPC-identified by a supplier to food supermarkets and like facilities.

In attaining the foregoing and other objects, the invention provides a method for the operator-unassisted checkout of articles, inclusive of bulk articles, typically of the nature of produce or the like, wherein the customer applies a UPC label to the bulk articles upon selection, as distinguished from the normal instances wherein the article bears a "source-applied" UPC indication, e.g., as in the case of source-packaged goods.

More specifically, the invention provides a system for operator-unassisted checkout of an article selected, from a plurality of articles available for purchase, the selected article bearing UPC indication. The system includes a UPC code reader for reading the UPC indication and for generating an output signal indicative thereof. A storage facility is included for storing signals indicative of the UPCs of all articles available for purchase correlated with identification of articles as being in the categories of (1) those having source of manufacture applied UPC indication, (2) those having customer-applied UPC indication and price per unit weight, and (3) those having customer-applied UPC indication and price per article unit.

For category (1) articles, "normal" price processing takes place, i.e., per the systems of the referenced patents, wherein the price is obtained from memory having price and UPC indication cross-correlated.

For category (2) articles, the article weight is obtained and is multiplied by the price per unit weight, obtained from memory having price per unit weight and UPC indication cross-correlated.

For category (3) articles, the number of articles purchased is determined, and that number is multiplied by the price per individual article, obtained from memory having price per individual article and UPC indication cross-correlated.

The determination of article weight and the determination of number of articles purchased may be determined by apparatus comprising a part of the systems of the referenced patents, as discussed below, or may be otherwise achieved.

The foregoing and other objects and features of the invention will be further understood from the following detailed description of preferred embodiments and practices of the invention and from the drawings wherein like reference numerals identify like parts and components throughout.

DETAILED DESCRIPTION OF PREFERRED EMBODIMENTS AND PRACTICES

Figure 1:
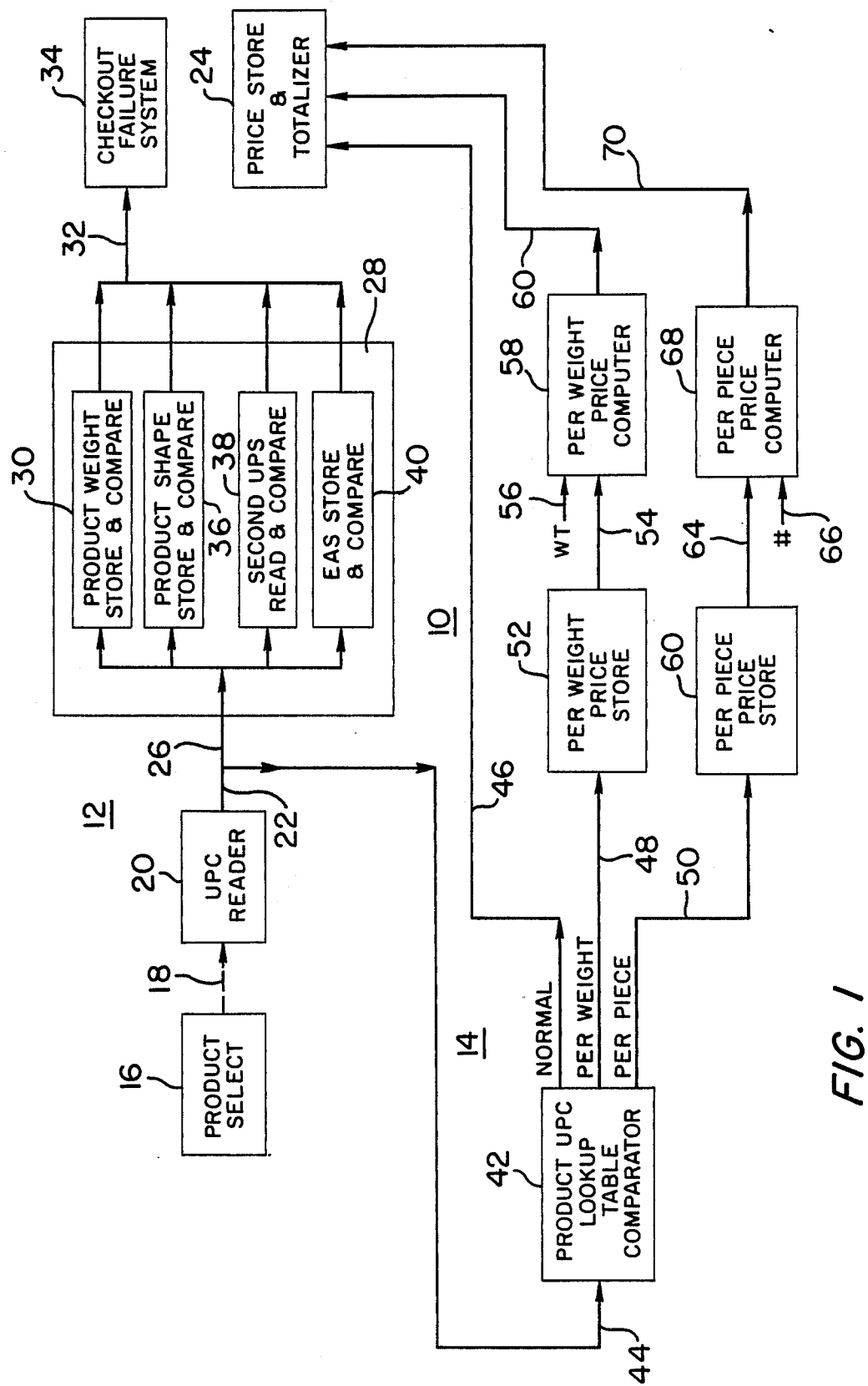
FIG. 1 is a block diagram of the subsystem of the invention in combination with the block diagram of the above referenced, commonly-assigned patents.

Referring to FIG. 1, system 10 in accordance with the invention includes upper channel 12 which is configured per the referenced commonly-assigned patents and a lower channel 14 configured per the subject invention. Upper channel 12 has a product select aspect 16, wherein a customer selects articles for purchase, dotted line 18 indicating the mechanical passing of the selected articles individually to UPC reader or scanner 20. The output of the reader is applied over line 22 to lower channel 14 and a price store and totalizer 24 is furnished with input signals from lower channel 14, both as below discussed in connection with lower channel operation.

In normal article processing, i.e., where the article has a source-applied UPC indication, per the disclosure of the first referenced patent, the scanned UPC identification, per selected article, provided on line 26, gives rise to the obtaining of the weight of the article from memory on entry of the article into security tunnel 28. Comparison is effected with an actual weight measurement of the selected article in product weight store and compare unit 30 and the comparison result (when negative) is applied over line 32 to checkout failure system 34, which provides suitable output indication of the checkout failure, likely due to customer fraud.

In following the procedures outlined in the second referenced patent, the line 26 UPC identification signal is applied to product shape store and compare unit 36, which effects a comparison of memory stored article shape characteristics with those obtained from article examination, such as would be obtained from the aforementioned entry light curtain associated with the security tunnel of the referenced patents. The UPC identification signal may also be applied from line 26 to second UPC read and compare unit 38, wherein the article UPC is again read in the security tunnel and compared with that obtained from reader 20. Further, the line 26 signal may be applied to EAS store and compare unit 40 which functions as above described. The outputs, on failure of positive results in comparisons in units 36, 38 and 40, apply an actuating input over line 32 to checkout failure system 34.

Lower channel 14, which may be considered to be a subsystem to the system of upper channel 12 includes a product UPC lookup table comparator 42, which receives the UPC identification on line 44 from reader 20. Comparator 42 includes in storage all UPC identifications cross-correlated with categories (1)-(3) above noted. The comparator regenerates the input UPC signal as NORMAL, on line 46 where the UPC lookup establishes that the input UPC signal corresponds to an article which bears a source-applied UPC indication, as PER WEIGHT, on line 48 where the UPC lookup establishes that the input UPC signal corresponds to an article which bears a customer-applied UPC indication and is to be sold by bulk weight, and as PER PIECE, on line 50 where the UPC lookup establishes that the input UPC signal corresponds to an article which bears a customer-applied UPC indication and is to be sold at a certain price per unit.

The line 46 NORMAL signal is applied to price store and totalizer 24 and responsive thereto, article price is obtained from memory cross-correlating UPC and price. The price is then totalized with any prior price totalization.

The line 48 PER WEIGHT signal is applied to PER WEIGHT price store 52 which is responsive thereto to provide an output signal on line 54 indicative of the price per unit weight for the article corresponding to the UPC indication in the line 48 signal. Line 56 has a signal thereon which is indicative of the actual weight (WT) of the article selected for purchase, which may be obtained, for example, from unit 30 of upper channel 12, which is in turn served with weight input from a scale beneath a conveyor transporting articles in the referenced patents.

The line 54 and line 56 signals are applied to PER WEIGHT price computer 58, which multiplies the weight by the price per unit weight to obtain the cost for the selected article. An output signal indicative of such cost is applied to line 60 and thence to an advanced processing stage of price store and totalizer 24, i.e., to be added to prior cost totalizations therein.

The line 50 PER PIECE signal is applied to PER PIECE price store 62 which is responsive thereto to provide an output signal on line 64 indicative of the price per piece for the article corresponding to the UPC indication in the line 50 signal. Line 66 has a signal thereon which is indicative of the actual number (#) of the article selected for purchase, which may be obtained, for example, from unit 36 of upper channel 12, which is in turn served with article shape input from circuitry responsive to the entry light curtain in the referenced patents. Number of articles may otherwise be entered through the use of a numeric key pad.

The line 64 and line 66 signals are applied to PER PIECE price computer 68, which multiplies the number of the article by the price per piece to obtain the cost for the selected article. An output signal indicative of such cost is applied to line 70 and thence to the advanced processing stage of price store and totalizer 24 as above discussed for the line 60 signal.

By way of example, a customer is assumed to have selected one-half dozen bananas. The bananas are placed in a bag at the point of selection and bearing a UPC indication for bananas, the indication either being pre-applied by the store personnel or applied by the customer. In the course of operator-unassisted checkout, the UPC indication on the bag is read and, preferably, the individual bananas are taken from the bag and placed individually on the conveyor. As the bananas pass through the entry light curtain they are individually sensed and their number is counted to provide the line 66 signal above. The system operation is concurrently as above discussed.

Figure 2:
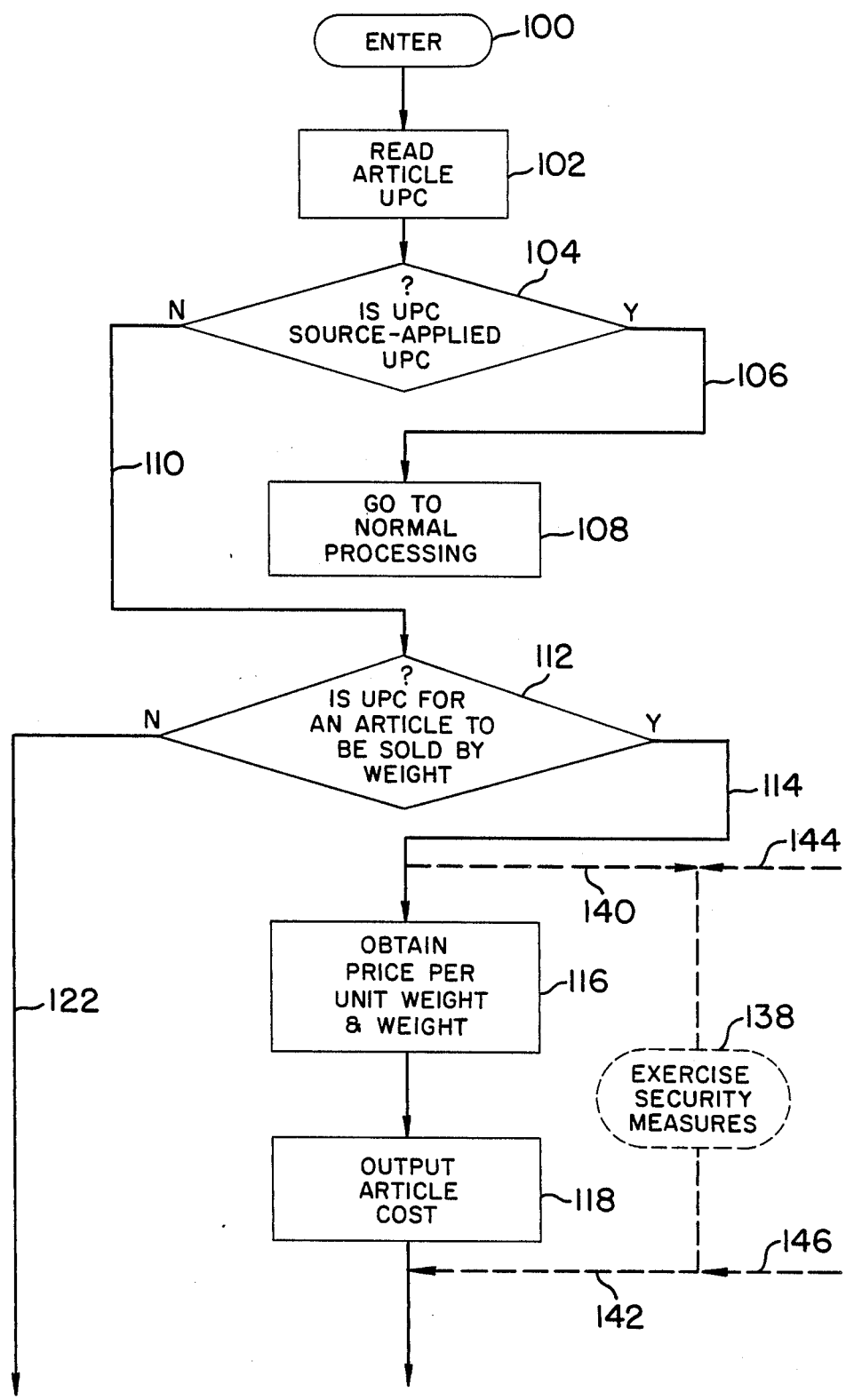
FIGS. 2 and 3 are flow charts of the operations involved in the system and practice of the invention.
Figure 3:
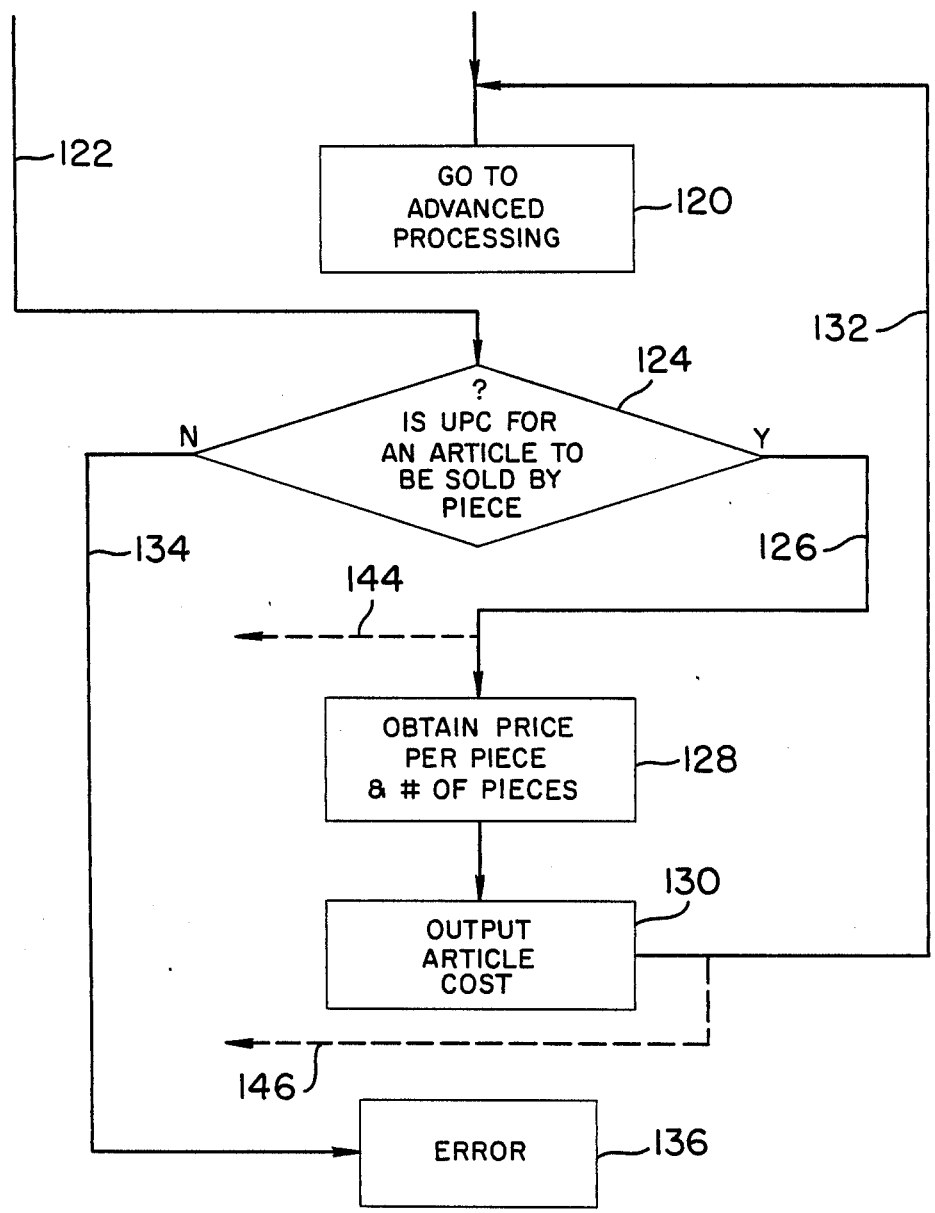

Logic operations, indicative particularly of those of comparator 42 and computers 58 and 68, will be further understood from the flow charts of FIGS. 2 and 3.

Subsystem 14 is entered (ENTER) in step 100. In step 102 (READ ARTICLE UPC), article UPC is scanned. In step 104(? IS UPC SOURCE-APPLIED UPC), a determination is made as to whether the article is of the customary type, having its UPC indication applied at the point of origin. If this inquiry is answered in the affirmative, line 106 leads to step 108 (GO TO NORMAL PROCESSING).

If the step 104 inquiry is answered in the negative, line 110 leads to step 112 (? IS UPC FOR AN ARTICLE TO BE SOLD BY WEIGHT), determination is made as to whether the article is of type to be bulk weight retailed. If yes, line 114 leads to step 116 (OBTAIN PRICE PER UNIT WEIGHT & WEIGHT), wherein reference is made to the aforementioned actual weight indication and to memory correlating UPC and price per unit weight. Step 118 follows (OUTPUT ARTICLE COST), wherein the weight indication is multiplied by the per unit weight price. This leads to step 120 (GO TO ADVANCED PROCESSING).

In the event that the response to the step 112 inquiry is answered in the negative, line 122 leads to step 124 (? IS UPC FOR AN ARTICLE TO BE SOLD BY PIECE), determination is made as to whether the article is of type to be piece retailed. If yes, line 126 leads to step 128 (OBTAIN PRICE PER PIECE & # OF PIECES), wherein reference is made to the actual piece count and to memory correlating UPC and price per unit weight. Step 130 follows (OUTPUT ARTICLE COST), wherein the piece count indication is multiplied by the per piece price. Line 132 leads to step 120 (GO TO ADVANCED PROCESSING).

In the event that the selected article is not found to be in any one of categories (1)–(3), as would be the case where negative response occurs in each of steps 104, 112 and 124, line 134 leads to step 136 (ERROR), wherein the subsystem provides output indication of an error condition to store personnel.

Phantom line indication is made in FIG. 2 of step 138 (EXERCISE SECURITY MEASURES) to indicate the option in the subsystem operation to include the security measures set forth with particularity in the referenced patents. By way of example, lines 140 and 142 show step 138 in practice concurrently with steps 116 and 118, whereby a weight verification is made as between the article weight as measured and the article weight as derived from memory containing article weight correlated with UPC indication. Absent such verification, the customer is presumed to have made a product substitution from the point of article scanning to conveyor transport thereof. Lines 144 and 146 indicate the security measure option in place with practice of steps 128 and 130.

Various changes to the system block diagram and modifications to the practice discussed may be made without departing from the invention. Thus, the particularly described preferred embodiment and method are intended in an illustrative and not in a limiting sense. The true spirit and scope of the invention is set forth in the following claims.

What is claimed is:

1. In combination, in a system for operator-unassisted checkout of articles, inclusive of articles retailed by bulk weight and per piece pricing and bearing UPC indication thereon:
   (a) reader means for reading article UPC indication and generating output signals indicative thereof;
   (b) comparator means for receipt of said reader means output signals and for providing first and second separate output signals respectively indicating that
      (1) the UPC indication in said reader means output signals is for an article retailed by bulk weight pricing, and
      (2) the UPC indication in said reader means output signals is for an article retailed per piece pricing.

2. The invention claimed in claim 1 further including storage means for storage of first and second stored signals respectively indicative of article price per unit of weight and article price per piece, both cross-correlated with article UPC indication.

3. The invention claimed in claim 2 further including means for providing first and second identifying signals respectively indicative of the weight and the numbers of an article selected for purchase.

4. The invention claimed in claim 3 further including first computer means operative upon occurrence of said comparator means first output signal for receiving said first stored signal and said first identifying signal and computing selected article price therefrom and second computer means operative upon occurrence of said comparator means second output signal for receiving said second stored signal and said second identifying signal and computing selected article price therefrom.

5. In combination, in a system for operator-unassisted checkout of articles retailed both by bulk weight pricing and otherwise and bearing UPC indication thereon:
   (a) reader means for reading article UPC indication and generating output signals indicative thereof; and
   (b) comparator means for receipt of said reader means output signals and for providing first and second output signals indicating respectively that the UPC indication in said reader means output signals is for an article retailed by bulk weight pricing and for an article otherwise retailed.

6. The invention claimed in claim 5 further including storage means for storage of stored signals indicative of article price per unit of weight cross-correlated with article UPC indication.

7. The invention claimed in claim 6 further including means for providing identifying signals indicative of the weight of an article selected for purchase.

8. The invention claimed in claim 7 further including computer means operative upon occurrence of said comparator means first output signal for receiving said stored signals and said identifying signals and computing selected article price therefrom.

9. In combination, in a system for operator-unassisted checkout of articles retailed both by per piece pricing and otherwise and bearing UPC indication thereon:
   (a) reader means for reading article UPC indication and generating output signals indicative thereof; and
   (b) comparator means for receipt of said reader means output signals and for providing first and second output signals indicating respectively that the UPC indication in said reader means output signals is for an article retailed by per piece pricing and for an article otherwise retailed.

10. The invention claimed in claim 9 further including storage means for storage of stored signals indicative of article price per piece cross-correlated with article UPC indication.

11. The invention claimed in claim 10 further including means for providing identifying signals indicative of the numbers of an article selected for purchase.

12. The invention claimed in claim 11 further including computer means operative upon occurrence of said comparator means first output signal for receiving said stored signals and said identifying signals and computing selected article price therefrom.

13. A system for operator-unassisted checkout of articles, inclusive of articles retailed at a price fully determinable by article UPC indication thereon, and articles retailed by bulk weight and per piece pricing and bearing UPC indication thereon, said system comprising:

(a) reader means for reading article UPC indication and generating output signals indicative thereof;

(b) comparator means for receipt of said reader means output signals and for providing first, second and third output signals respectively indicating that (1) the UPC indication in said reader means output signals is for an article having price fully determinable therefrom, (2) the UPC indication in said reader means output signals is for an article retailed by bulk weight pricing, and (3) the UPC indication in said reader means output signals is for an article retailed per piece pricing; and (c) article price obtaining means for operative response (1) to said first comparator means output signal for obtaining a price for the selected article, (2) to said second comparator means output signal for obtaining a price for the selected article by computation of UPC-obtained article price per unit weight and the weight of said article, and (3) to said third comparator means output signal for obtaining a price for the selected article by computation of UPC-obtained article price per piece and the numbers of said article.

* * * * *